US011117189B2

(12) United States Patent
Lynch et al.

(10) Patent No.: US 11,117,189 B2
(45) Date of Patent: Sep. 14, 2021

(54) ADDITIVELY MANUFACTURED CARBON DIOXIDE SCRUBBER

(71) Applicant: HAMILTON SUNDSTRAND CORPORATION, Charlotte, NC (US)

(72) Inventors: Matthew E. Lynch, Canton, CT (US); Thomas P Filburn, Granby, CT (US); Tahany Ibrahim El-Wardany, Vernon, CT (US); Peter J. Walsh, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 383 days.

(21) Appl. No.: 15/938,865

(22) Filed: Mar. 28, 2018

(65) Prior Publication Data

US 2019/0299292 A1    Oct. 3, 2019

(51) Int. Cl.
*B33Y 80/00* (2015.01)
*B22F 3/11* (2006.01)
*B01D 53/14* (2006.01)
*B22F 10/20* (2021.01)
*B22F 10/00* (2021.01)
*B33Y 10/00* (2015.01)

(52) U.S. Cl.
CPC ........ *B22F 3/1115* (2013.01); *B01D 53/1475* (2013.01); *B01D 53/1493* (2013.01); *B22F 10/00* (2021.01); *B22F 10/20* (2021.01); *B01D 2252/20405* (2013.01); *B01D 2257/504* (2013.01); *B33Y 10/00* (2014.12); *B33Y 80/00* (2014.12)

(58) Field of Classification Search
CPC .. B01D 46/2418; F01N 3/022; F28F 2250/04; B22F 3/1115
See application file for complete search history.

(56) References Cited

U.S. PATENT DOCUMENTS

| 5,108,685 A * | 4/1992 | Kragle | B28B 3/269 |
| | | | 264/177.12 |
| 8,940,242 B2 * | 1/2015 | Chen | F01N 3/2828 |
| | | | 422/177 |
| 2019/0024987 A1 * | 1/2019 | Moore | F28F 7/02 |

FOREIGN PATENT DOCUMENTS

| CN | 105020566 | 11/2015 |
| CN | 105177339 | 12/2015 |

OTHER PUBLICATIONS

USPTO, Restriction/Election Requirement dated Feb. 5, 2020 in U.S. Appl. No. 15/938,998.
(Continued)

*Primary Examiner* — Adam Krupicka
(74) *Attorney, Agent, or Firm* — Snell & Wilmer L.L.P.

(57) ABSTRACT

A metal lattice for a carbon dioxide scrubber may comprise a metal lattice body defining a plurality of intersecting ligaments, wherein nodes are formed at said intersections. In various embodiments, the metal lattice may be manufactured using an additive manufacturing process. A node density of the metal lattice may vary. A ligament thickness of the metal lattice may vary. The metal lattice may comprise liner defining a channel extending through the metal lattice.

19 Claims, 13 Drawing Sheets

(56) References Cited

OTHER PUBLICATIONS

USPTO, Pre-Interview First Office Action dated May 14, 2020 in U.S. Appl. No. 15/938,998.
USPTO, First Action Interview Office Action dated Jun. 29, 2020 in U.S. Appl. No. 15/938,998.
USPTO, Notice of Allowance dated Dec. 3, 2020 in U.S. Appl. No. 15/938,998.
USPTO, Corrected Notice of Allowance dated Jan. 19, 2021 in U.S. Appl. No. 15/938,998.

* cited by examiner

A-A

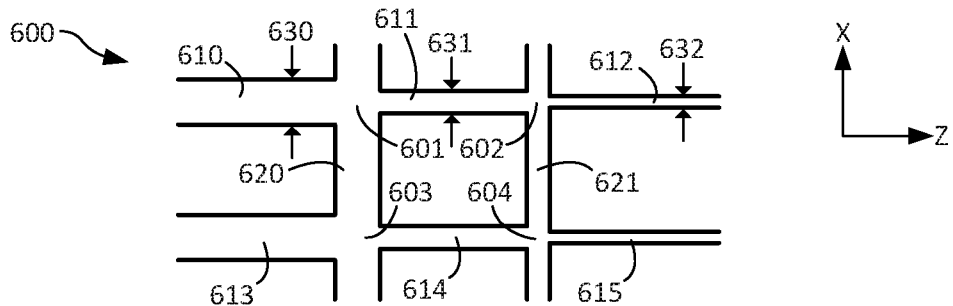
FIG. 6
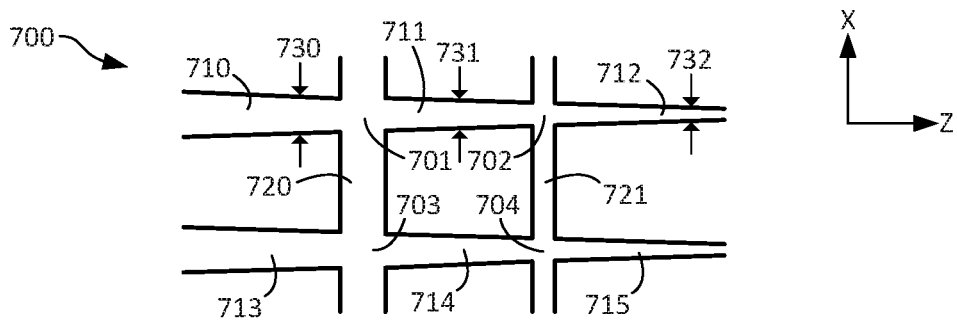
FIG. 7
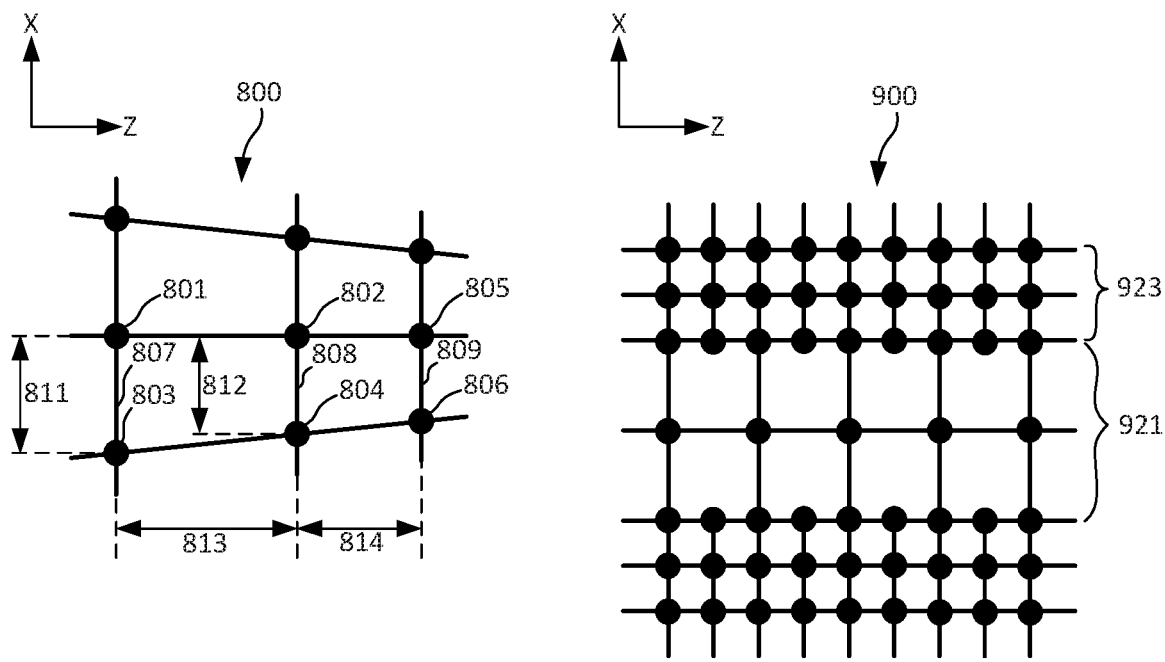
FIG. 8
FIG. 9

ADDITIVELY MANUFACTURED CARBON DIOXIDE SCRUBBER

FIELD

This disclosure relates to systems and methods for a carbon dioxide scrubber.

BACKGROUND

Exposure to carbon dioxide partial pressures exceeding about 7.6 mm Hg (millimeters of mercury, partial pressure of about 1%), for extended periods of time are known to cause health problems in humans and other mammals. As a result, self-contained habitable systems, such as those existing in a submarine or a space craft, are typically maintained below about 1% via the use of the use of a carbon dioxide ($CO_2$) scrubber.

Amines such as monoethanolamine and diethanotamine are often used in a liquid phase to reduce carbon dioxide partial pressures via absorption. These amines are utilized in the aqueous phase or can be impregnated into the pores of granular support material such as activated carbon, alumina, or PMMA. A carbon dioxide containing gaseous stream is introduced into the amine-containing scrubber. While intimately contacting the gaseous stream, the amine solution chemically reacts with the carbon dioxide to absorb and remove the carbon dioxide from the gaseous stream. Desorption of the absorbed carbon dioxide then proceeds via a pressure swing and/or thermal regeneration process at elevated temperatures, such as temperatures in excess of about 150° F. (about 66° C.). During desorption, carbon dioxide and water evolve from the amine solution and may be separated by condensing the water vapor in a heat exchanger. Once regenerated, the amine solution is recycled back to the absorption tower for additional carbon dioxide absorption.

SUMMARY

A metal lattice for a carbon dioxide scrubber is disclosed, comprising a metal lattice body defining a plurality of intersecting ligaments, wherein nodes are formed at intersections of the plurality of intersecting ligaments, and a liner extending through the metal lattice body and defining a channel and a plurality of apertures whereby the channel is in fluidic communication with the metal lattice body.

In various embodiments, the metal lattice is formed by an additive manufacturing process comprising one of a powder bed fusion and a directed energy deposition.

In various embodiments, the metal lattice body and the liner are manufactured during a single additive manufacturing process.

In various embodiments, the channel is hollow.

In various embodiments, a portion of the metal lattice body extends into the channel.

A metal lattice for a carbon dioxide scrubber is disclosed, comprising a metal lattice body defining a plurality of intersecting ligaments, wherein nodes are formed at intersections of the plurality of intersecting ligaments and wherein a node density of the metal lattice body varies.

In various embodiments, the metal lattice is formed by an additive manufacturing process comprising one of a powder bed fusion, a powder-feed directed energy deposition process, and a wire-feed directed energy deposition process.

In various embodiments, the additive manufacturing process is a laser powder bed fusion process.

In various embodiments, the metal lattice body comprises a cross-sectional profile having a first portion comprising a first node density and a second portion comprising a second node density at least partially surrounding the first portion.

In various embodiments, the first node density is different from the second node density.

In various embodiments, a thickness of each the plurality of intersecting ligaments is constant.

In various embodiments, the metal lattice is made from a metal material comprising aluminum or an aluminum alloy.

In various embodiments, the first portion defines a channel extending longitudinally through the metal lattice.

A metal lattice for a carbon dioxide scrubber is disclosed, comprising a metal lattice body defining a plurality of intersecting ligaments, wherein nodes are formed at intersections of the plurality of intersecting ligaments, and wherein a ligament thickness of the metal lattice body varies along at least one of a longitudinal direction or a transverse direction.

In various embodiments, the metal lattice is formed by an additive manufacturing process comprising one of a fused deposition modeling process, an electron beam freeform fabrication process, a direct metal laser sintering process, an electron-beam melting process, a selective laser melting process, a selective heat sintering process, a selective laser sintering process, and a stereolithography process.

In various embodiments, the additive manufacturing process is the direct metal laser sintering process.

In various embodiments, the metal lattice body comprises a cross-sectional profile having a first portion comprising a first ligament thickness and a second portion comprising a second ligament thickness at least partially surrounding the first portion.

In various embodiments, the first ligament thickness is different from the second ligament thickness.

In various embodiments, a node density of at least one of the first portion or the second portion is constant.

In various embodiments, the first portion defines a channel extending longitudinally through the metal lattice.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

FIG. 6 illustrates a cross-sectional profile of a metal lattice body having a ligament thickness varying in a stepped fashion, in accordance with various embodiments;

FIG. 7 illustrates a cross-sectional profile of a metal lattice body having a ligament thickness varying in a quasi-continuous manner, in accordance with various embodiments;

FIG. 8 illustrates a schematic view of a metal lattice having a varying node density, in accordance with various embodiments;

FIG. 9 illustrates a schematic view of a metal lattice having a varying ligament thickness, in accordance with various embodiments;

DETAILED DESCRIPTION

Figure 1:
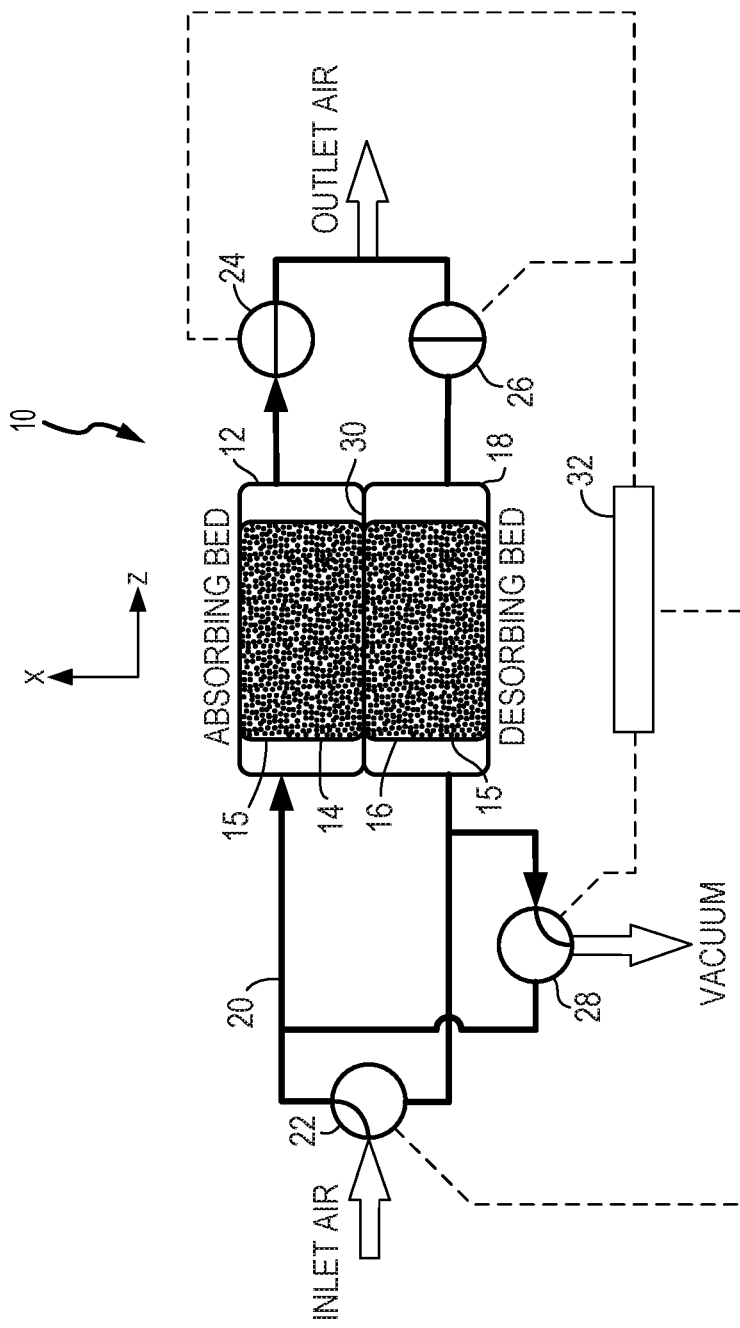
FIG. 1 illustrates carbon dioxide scrubber system, in accordance with various embodiments.

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, the term "longitudinal" refers to the general direction of a flow of air through a metal lattice. As used herein, the term "transverse" refers to a direction that is perpendicular to the general direction of a flow of air through the metal lattice.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, powder bed fusion (including laser, electron beam, or magnetic flux, among others) and directed energy deposition (including powder and wire feedstock). These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

With reference to FIG. 1, a segmented and thermally connected dual bed $CO_2$ scrubber 10 is illustrated, in accordance with various embodiments. In the first bed 12 of the $CO_2$ scrubber, a first portion 14 of an amine sorbent dispersed within the pores of a metal lattice 15 is in the absorption cycle. In a second bed 18, the remainder 16 of the sorbent, also dispersed within the metal lattice 15, is in the desorption cycle.

Particular amines suitable for forming the sorbent include diethanolamine (DEA), diisopropanolamine (DIPA), and 2-hydoxyethyl piperazine (HEP). Suitable amines possess secondary and/or primary amines together with alcohol (OH) functionality.

The metal lattice may be formed from a metal material, such as aluminum and aluminum alloys, among others. In various embodiments, the metal lattice may comprise about 3-40% of the bed volume, and in various embodiments, may comprise about 5-20% of the bed volume and in various embodiments, may comprise about 5-10% of the bed volume.

The solid amine sorbent is lodged within the pores of the metal lattice and is thus dispensed throughout beds 12 and 18.

A support material, typically in the form of pellets or beads, may be supported throughout the metal lattice, and may support the amine solution.

In the absorption cycle, a stream 20 of inlet air containing carbon dioxide and water vapor (if present) is provided to bed 12 though two-way valve 22. As the air stream containing carbon dioxide flows through the sorbent 14 in bed 12, an exothermic reaction occurs between the carbon dioxide and the amine, thereby forming the amine complex and removing the carbon dioxide from the air stream. The amine may also act to absorb water vapor if it is present in the gas stream. Outlet air from which the carbon dioxide and water vapor has been removed exits to the habitable environment through valve 24.

As noted above, the sorbent 16 in bed 18 is in the desorption cycle. The bed enters the desorption cycle once it has become saturated with carbon dioxide, or at a designated absorption time. In either case the sorbent 16 must be regenerated. This involves positioning two-way valve 22 to stop the flow of inlet air to bed 18 and also closing valve 26 to prevent contaminated air from exiting the bed and entering the habitable environment. Carbon dioxide and water vapor (if present) are then desorbed from the bed 18 by thermal and/or reduced pressure means.

In the embodiment illustrated in FIG. 1 both thermal and/or reduced pressure means are used to regenerate the bed. The heat produced during absorption in bed 12 is transferred to the sorbent 16 in the second bed 18 to drive the endothermic desorption of the absorbed carbon dioxide and water. Heat transfer between the beds is provided by the metal lattice 15 in each of the beds 12 and 18 and the common wall 30 between the beds. In addition, the sorbent 16 is exposed to a vacuum source, such as space vacuum, through valve 28. Exposure of the sorbent 16 to such a pressure gradient enhances the overall performance of the $CO_2$ scrubber 10 by facilitating the regeneration of the sorbent for subsequent carbon dioxide absorption.

After a predetermined time interval or at a specified carbon dioxide concentration, the absorption and desorption cycles are reversed, i.e., bed 12 enters the desorption cycle and bed 18 enters the absorption cycle. This is accomplished by reversing the valve settings shown in FIG. 1 and exposing the bed 12 to vacuum. The valves are automatically controlled by a controller 32 which is responsive to a sensor which detects the level of $CO_2$ in the beds or to a predetermined absorption time interval.

With reference to FIGS. 2 through FIG. 20, a metal lattice for a $CO_2$ scrubber is illustrated, in accordance with various embodiments. The metal lattice is made by additive manufacturing processes. Additive manufacturing techniques may allow the design of structures to be optimized for load, strength, tuned bending and/or buckling resistance, tuned natural frequency and vibration characteristics, improved thermal characteristics, and/or tuned aerodynamic characteristics. In various embodiments, the geometry and configuration of the metal lattice comprises a configuration that improves structural performance (e.g., is resistant to bending and/or buckling due to a pressure gradient between the absorbing bed and the desorbing bed), thermal performance (e.g., tends to aid in heat transfer from the absorbing bed to the desorbing bed), dynamic stability, among other benefits. The metal lattice can comprise structures optimized with geometric characteristics such as increasing ligament thickness, increasing node spacing, airfoil-like geometry for air flow turning, and/or the like to tune stiffness, reduce weight, tune bending resistance, and improve thermal characteristics.

Figure 2:
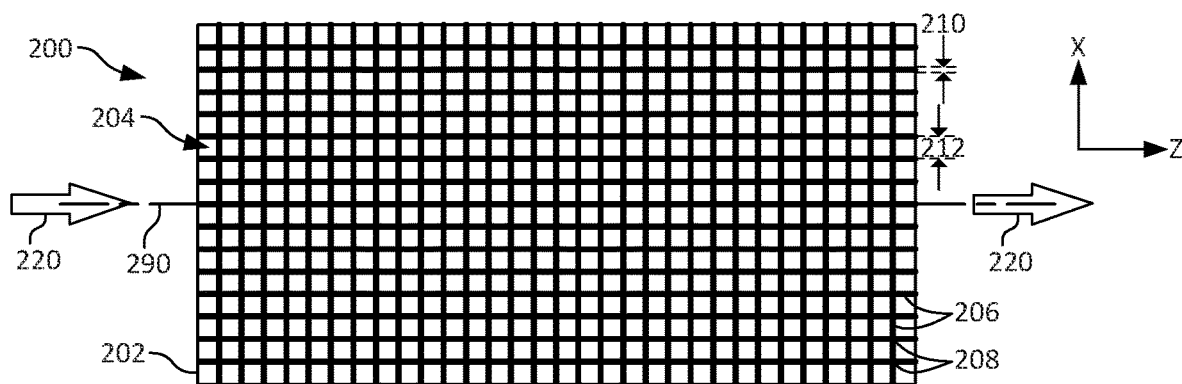
FIG. 2 illustrates a cross-sectional profile of a metal lattice body having constant ligament thickness and constant node density, in accordance with various embodiments.

With reference to FIG. 2, a cross-section view of a metal lattice 200 for a $CO_2$ scrubber is illustrated, in accordance with various embodiments. Metal lattice 200 may be used in bed 12 and/or bed 18 of $CO_2$ scrubber 10, with momentary reference to FIG. 1. Metal lattice 200 may comprise a metal lattice body (also referred to herein as a metal lattice) 204. Metal lattice 200 is made by additive manufacturing processes. Metal lattice 200 may be made from a metal or alloy thereof, such as aluminum or an aluminum alloy, among others. Metal lattice 200 may be disposed in a bed (also referred to herein as a housing) 202. Housing 202 may be made from a metal or alloy thereof, such as aluminum or an aluminum alloy, among others. Metal lattice body 204 may comprise a plurality of ligaments 206 intersecting to form a plurality of nodes 208. In this regard, nodes 208 may be defined by locations of intersection of two or more ligaments 206.

In various embodiments, metal lattice 204 may be structured. For example, a cross-sectional profile of metal lattice 204 may comprise a square structure (in the two-dimensional space), as illustrated in FIG. 2. It should be understood, however, that in the three-dimensional space, metal lattice 204 may comprise a cubic lattice, such as that illustrated in FIG. 18A or FIG. 18B, for example. However, metal lattice 204 may comprise any structured lattice, comprising any polygonal geometry, ellipsoidal geometry, and/or circular geometry, among others. Exemplary isometric views of a metal lattice, in the three-dimensional space are illustrated in FIGS. 18A through FIG. 18F. However, the geometry of a structured metal lattice is not be limited to these examples.

In various embodiments, metal lattice 204 may comprise a constant ligament thickness 210 throughout metal lattice 204. In various embodiments, metal lattice 204 may comprise a constant distance 212 between nodes 208 throughout metal lattice 204. The distance 212 between adjacent nodes 208 may be constant in all directions, including the X-direction, Y-direction, and Z-direction.

In various embodiments, an air stream 220 may flow through metal lattice 204. Constant distance 212 between all of the nodes 208 may tend to promote even flow distribution of air stream 220 through housing 202. Metal lattice 204 may define a centerline 290. Air stream 220 may flow generally through metal lattice 204 in a direction parallel with centerline 290 (i.e., the Z-direction).

Figure 3A:
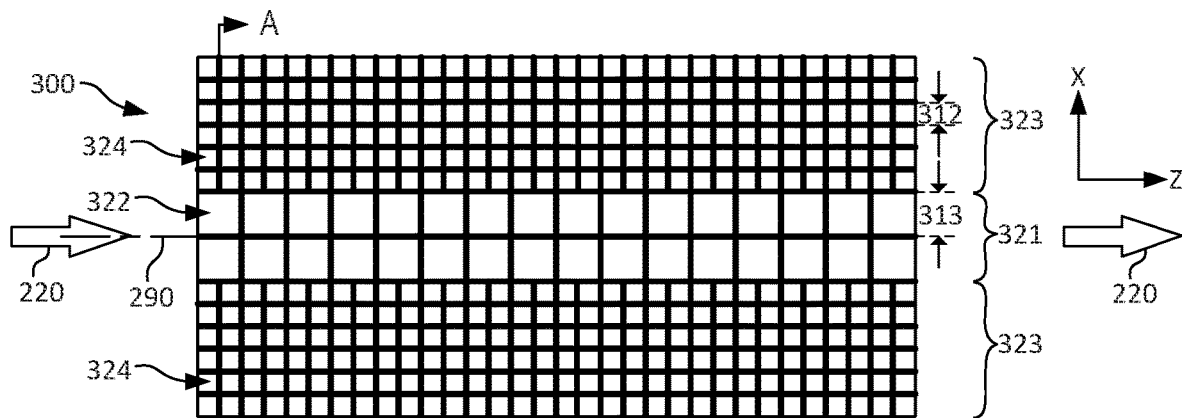
FIG. 3A illustrates a cross-sectional profile of a metal lattice body having constant ligament thickness and regions of different node densities, one of which defines a channel, in accordance with various embodiments.

With respect to FIG. 3A, elements with like element numbering, as depicted in FIG. 2, are intended to be the same and will not necessarily be repeated for the sake of clarity.

With reference to FIG. 3A, a cross-section view of a metal lattice 300 for a $CO_2$ scrubber is illustrated, in accordance with various embodiments. In various embodiments, metal lattice 200 of FIG. 2 may be similar to metal lattice 300. Metal lattice 300 comprises a node density discontinuity. That is, metal lattice 300 may comprises a first portion 321 comprising a first node density 322 along the centerline 290 and may comprise a second portion 323 comprising a second node density 324 outward from centerline 290. First node density 322 may be defined by a number of nodes per unit volume. First node density 322 may be defined by a distance 313 between nodes. Likewise, second node density 324 may be defined by a number of nodes per unit volume. Second node density 324 may be defined by a distance 312 between nodes. Distance 312 may be less than distance 313. In this regard, first node density 322 may be less than second node density 324.

Figure 3B:
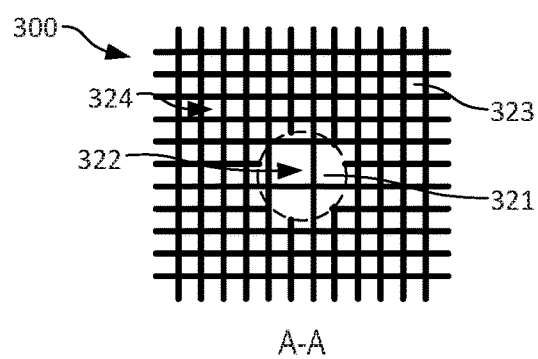
FIG. 3B illustrates a perpendicular cross-sectional profile of the metal lattice of FIG. 3A, in accordance with various embodiments.

With reference to FIG. 3B, a sectional view, orthogonal to the view of FIG. 3A, of metal lattice 300 is illustrated, in accordance with various embodiments. In various embodiments, first portion 321 may define a cylindrical geometry extending along centerline 290. First portion 321 may be concentric with centerline 290. Second portion 323 may be disposed outward from first portion 321. Second portion 323 may surround first portion 321.

In various embodiments, instead of comprising portions (e.g., first portion 321 and second portion 323) of uniform node density, the node density of metal lattice 300 may be graded. Stated differently, the node density may vary linearly along the length of the ligaments, similar to metal lattice 800 of FIG. 8 for example, as described herein.

In various embodiments, first node density 322 may allow for greater air flow through metal lattice 300. In various embodiments, second node density 324 may tend to provide greater thermal transport throughout second portion 323. In various embodiments, second node density 324 may tend to provide greater structural support.

Figure 4A:
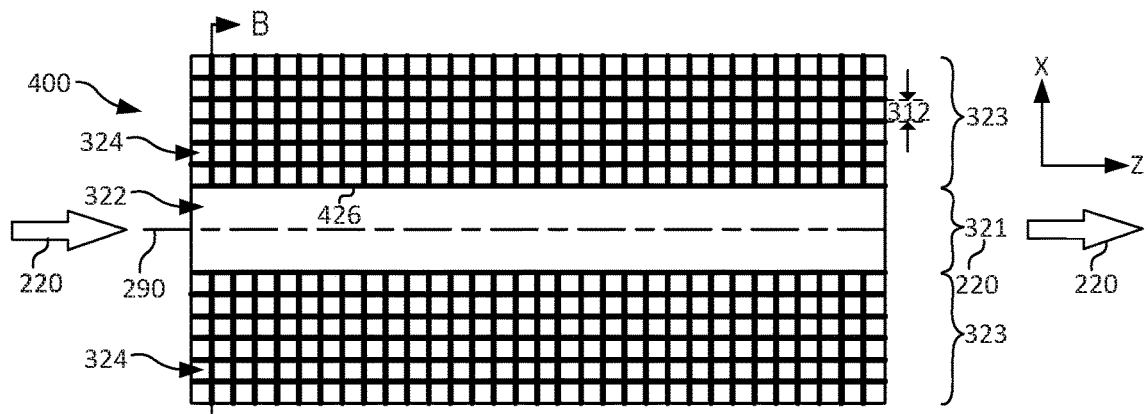
FIG. 4A illustrates a cross-sectional profile of a metal lattice body having constant ligament thickness and hollow channel extending longitudinally through the metal lattice body, in accordance with various embodiments.

With respect to FIG. 4A, elements with like element numbering, as depicted in FIG. 3A, are intended to be the same and will not necessarily be repeated for the sake of clarity.

With reference to FIG. 4A, a cross-section view of a metal lattice 400 for a $CO_2$ scrubber is illustrated, in accordance with various embodiments. In various embodiments, metal lattice 200 of FIG. 2 may be similar to metal lattice 400. Metal lattice 400 comprises a node density discontinuity. That is, metal lattice 400 may comprise a first portion 321 comprising a first node density 322 along the centerline 290 and may comprise a second portion 323 comprising a second node density 324 outward from centerline 290. First node density 322 may be defined by a number of nodes per unit volume. First node density may be zero. Stated differently, a hollow channel 426 may be defined through metal lattice 400.

Figure 4B:
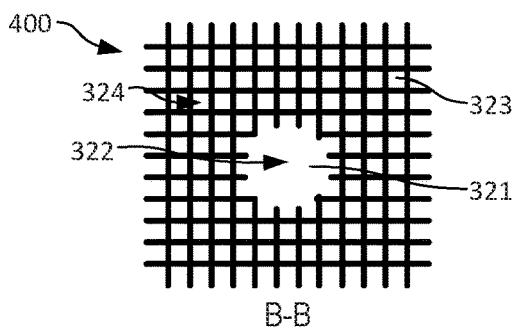
FIG. 4B illustrates a perpendicular cross-sectional profile of the metal lattice of FIG. 4A, in accordance with various embodiments.

With reference to FIG. 4B, a sectional view, orthogonal to the view of FIG. 4A, of metal lattice 400 is illustrated, in accordance with various embodiments. In various embodiments, first portion 321 may define a cylindrical geometry extending along centerline 290. First portion 321 may be concentric with centerline 290. Second portion 323 may be disposed outward from first portion 321. Second portion 323 may surround first portion 321.

Figure 5A:
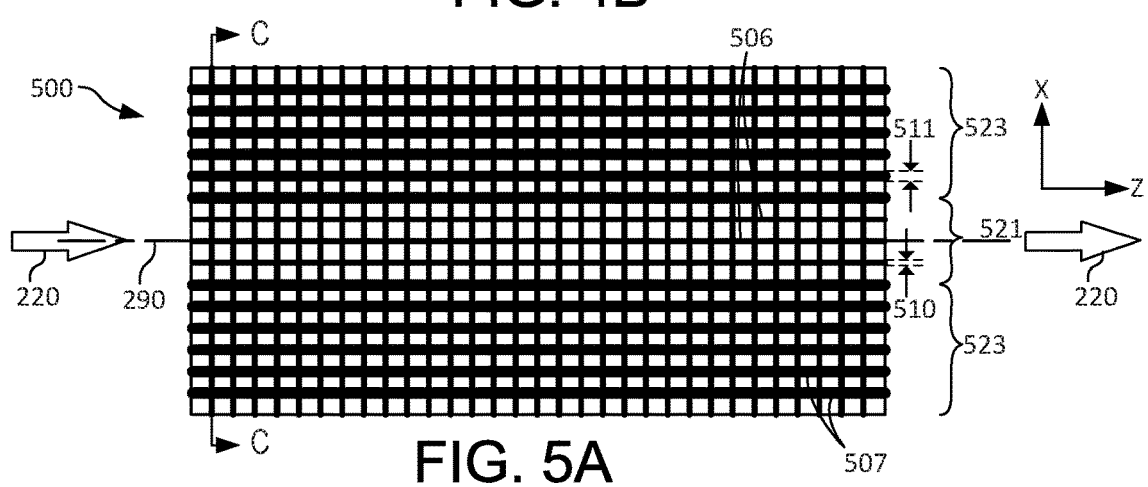
FIG. 5A illustrates a cross-sectional profile of a metal lattice body having a channel extending longitudinally through the metal lattice body defined by a decreased ligament thickness, in accordance with various embodiments.

With respect to FIG. 5A, elements with like element numbering, as depicted in FIG. 2A, are intended to be the same and will not necessarily be repeated for the sake of clarity.

With reference to FIG. 5A, a cross-section view of a metal lattice 500 for a $CO_2$ scrubber is illustrated, in accordance with various embodiments. In various embodiments, metal lattice 200 of FIG. 2 may be similar to metal lattice 500. Metal lattice 500 comprises a ligament thickness discontinuity. That is, metal lattice 500 may comprises a first portion 521 comprising a first ligament thickness 510 along the centerline 290 and may comprise a second portion 523 comprising a second ligament thickness 511 outward from centerline 290. First ligament thickness 510 may be defined by the thickness of each ligament 506 extending longitudinally (i.e., parallel to centerline 290) within first portion 521. Likewise, second ligament thickness 511 may be defined by the thickness of each ligament 507 extending longitudinally (i.e., parallel to centerline 290) within second portion 523. First ligament thickness 510 may be less than second ligament thickness 511.

In various embodiments, instead of comprising portions (e.g., first portion 521 and second portion 523) of uniform thickness, the ligament thickness of metal lattice 500 may be graded. Stated differently, the ligament thickness may vary linearly along the length of the ligaments, similar to metal lattice 600 of FIG. 6 or metal lattice 700 of FIG. 7 as described herein.

Figure 5B:
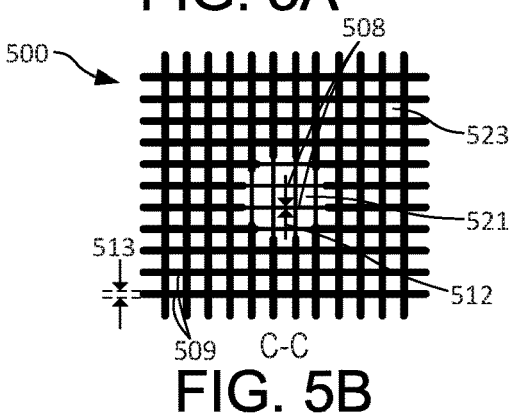
FIG. 5B illustrates a perpendicular cross-sectional profile of the metal lattice of FIG. 5A, in accordance with various embodiments.

With reference to FIG. 5B, a sectional view, orthogonal to the view of FIG. 5A, of metal lattice 500 is illustrated, in accordance with various embodiments. In various embodiments, first portion 521 may define a cylindrical geometry extending along centerline 290. First portion 521 may be concentric with centerline 290. Second portion 523 may be disposed outward from first portion 521. Second portion 523 may surround first portion 521.

In various embodiments, first portion 521 may comprise a third ligament thickness 512 defined by the thickness of each ligament 508 extending transversely (i.e., orthogonal to centerline 290) within first portion 521. Second portion 523 may comprise a fourth ligament thickness 513 defined by the thickness of each ligament 509 extending transversely (i.e., orthogonal to centerline 290) within second portion 523. Third ligament thickness 512 may be less than fourth ligament thickness 513.

With combined reference to FIG. 5A and FIG. 5B, first ligament thickness 510 may be equal to third ligament thickness 512, in accordance with various embodiments. In various embodiments, second ligament thickness 511 may be equal to fourth ligament thickness 513. In various embodiments, second ligament thickness 511 may be greater than fourth ligament thickness 513. In various embodiments, third ligament thickness 512 may be equal to fourth ligament thickness 513.

In various embodiments, first ligament thickness 510 and/or third ligament thickness 512 in first portion 521 may allow for greater air flow through metal lattice 300. In various embodiments, second ligament thickness 511 and/or fourth ligament thickness 513 in second portion 523 may tend to provide greater thermal transport. In various embodiments, second ligament thickness 511 and/or fourth ligament thickness 513 in second portion 523 may tend to provide greater structural support.

With reference to FIG. 6, a sectional view of a metal lattice 600 is illustrated, in accordance with various embodiments. In various embodiments, metal lattice 500 of FIG. 5A may be similar to metal lattice 600. In various embodiments, adjacent ligaments of metal lattice 600 may comprise different thicknesses. The thicknesses between adjacent ligaments may increase and/or decrease in a stepped formation. Stated differently, the thickness of each ligament may be constant between nodes, while the thickness of adjacent ligaments, separated by nodes, is different. In this regard, the thickness of a ligament may be constant between nodes on either side of the ligament, whereas the thickness of a first ligament extending from a node may be different from the thickness of a second ligament extending from the same node.

In various embodiments, metal lattice 600 may comprise a plurality of ligaments and a plurality of nodes. Metal lattice 600 may comprise a node 601 formed by a ligament 610, a ligament 611, and a ligament 620. Ligament 610, ligament 611, and ligament 620 may intersect at node 601. Metal lattice 600 may comprise a node 602 formed by a ligament 611, a ligament 612, and a ligament 621. Ligament 611, ligament 612, and ligament 621 may intersect at node 602. Metal lattice 600 may comprise a node 603 formed by ligament 620, a ligament 613, and a ligament 614. Ligament 620, ligament 613, and ligament 614 may intersect at node 603. Metal lattice 600 may comprise a node 604 formed by ligament 621, ligament 614, and a ligament 615. Ligament 621, ligament 614, and ligament 615 may intersect at node 604.

In various embodiments, ligament 610, ligament 613, and ligament 620 may comprise a thickness (also referred to herein as a first thickness) 630. Ligament 611, ligament 614, and ligament 621 may comprise a thickness (also referred to herein as a second thickness) 631. Ligament 612 and ligament 615 may comprise a thickness (also referred to herein as a third thickness) 632. FIG. 6 illustrates decreasing thickness of ligaments along a first direction (i.e., the positive Z-direction) and a constant ligament thickness along a second direction (i.e., the X-direction). It is contemplated herein that the thickness of ligaments along both the first direction and the second direction may increase and/or decrease. It is contemplated herein that the thickness of ligaments along the first direction, the second direction, and a third direction (e.g., the Y-direction) may increase and/or decrease.

With reference to FIG. 7, a sectional view of a metal lattice 700 is illustrated, in accordance with various embodiments. In various embodiments, metal lattice 500 of FIG. 5A may be similar to metal lattice 700. In various embodiments, adjacent ligaments of metal lattice 600 may comprise different thicknesses. The thicknesses between adjacent ligaments may increase and/or decrease in a continuous manner by varying the thickness of the ligaments linearly along their length. Stated differently, the thickness of each ligament may vary along the length of the ligament, wherein each ligament along a single direction becomes successively thinner and/or thicker. In this regard, the thickness of a ligament may vary between nodes. In various embodiments, each ligament along a single direction may become successively thicker and then become successively thinner, similar to metal lattice 122 of FIG. 15 for example. Furthermore, each ligament along a single direction may become successively thicker and/or thinner and then the thickness along said direction may remain constant, similar to metal lattice 122 of FIG. 15 for example.

In various embodiments, metal lattice 700 may comprise a plurality of ligaments and a plurality of nodes. Metal lattice 700 may comprise a node 701 formed by a ligament 710, a ligament 711, and a ligament 720. Ligament 710 ligament 711, and ligament 720 may intersect at node 701. Metal lattice 600 may comprise a node 702 formed by a ligament 711, a ligament 712, and a ligament 721. Ligament 711, ligament 712, and ligament 721 may intersect at node 702. Metal lattice 700 may comprise a node 703 formed by ligament 720, a ligament 713, and a ligament 714. Ligament 720, ligament 713, and ligament 714 may intersect at node 703. Metal lattice 700 may comprise a node 704 formed by ligament 721, ligament 714, and a ligament 715. Ligament 721, ligament 714, and ligament 715 may intersect at node 704.

In various embodiments, ligament 710 and ligament 713 may comprise a thickness (also referred to herein as a first thickness) 730 which varies along a first direction (e.g., the Z-direction). Ligament 711 and ligament 714 may comprise a thickness (also referred to herein as a second thickness) 731 which varies along the first direction. Ligament 712 and ligament 715 may comprise a thickness (also referred to herein as a third thickness) 732 which varies along the first direction. The thickness of ligament 720 and the thickness of ligament 721 may be constant. FIG. 7 illustrates decreasing thickness of ligaments along the first direction (i.e., the positive Z-direction) and a constant ligament thickness along a second direction (i.e., the X-direction). It is contemplated herein that the thickness of ligaments along both the first direction and the second direction may increase and/or decrease. It is contemplated herein that the thickness of ligaments along the first direction, the second direction, and a third direction (e.g., the Y-direction) may increase and/or decrease.

With reference to FIG. 8, a schematic view of a metal lattice 800 is illustrated, in accordance with various embodiments. In various embodiments, metal lattice 200 of FIG. 2 may be similar to metal lattice 800. In various embodiments, metal lattice 800 may comprise varying distances between adjacent nodes. The distance between adjacent nodes may increase and/or decrease along a single direction. In this manner, the node density may increase and/or decrease along a single direction in a continuous manner.

Metal lattice 800 may comprise a node 801 and a node 803 having a ligament 807 extending there between. Node 801 may be spaced apart from node 803 by a distance 811. Metal lattice 800 may comprise a node 802 and a node 804 having a ligament 808 extending there between. Node 802 and node 804 may be disposed adjacent to node 801 and node 803. Node 802 may be spaced apart from node 804 by a distance 812. Distance 812 may be less than distance 811. In this regard, the node spacing between transversely adjacent nodes (e.g., node 803 and node 801) may decrease along a first direction (e.g., the positive Z-direction).

In various embodiments, node 803 may be spaced apart from node 804 by a distance 813. Metal lattice 800 may comprise a node 805 and a node 806 having a ligament 809 extending there between. Node 805 and node 806 may be disposed adjacent to node 802 and node 804. Node 804 may be spaced apart from node 806 by a distance 814. Distance 814 may be less than distance 813. In this regard, the node spacing between adjacent nodes (e.g., node 804 and node 806) may decrease along the first direction. In various embodiments, node spacing may vary in a continuous manner. Stated differently, the node spacing may decrease by a constant percentage along a direction. In various embodiments, node spacing may vary in a non-continuous manner. Stated differently, the node spacing may decrease by a varying percentage along a direction.

With reference to FIG. 9, a schematic view of a metal lattice 900 is illustrated, in accordance with various embodiments. In various embodiments, metal lattice 300 of FIG. 3A may be similar to metal lattice 900. In various embodiments, metal lattice 900 may comprise varying distances between adjacent nodes. The metal lattice 900 may have portions having a constant first node density disposed adjacent to portions having a constant second node density. In this manner, the node density may increase and/or decrease along a single direction in a stepped manner.

In various embodiments, metal lattice 900 may have a first portion 921 having a first node density and may have a second portion 923 having a second node density. The second node density may be greater than the first node density. In various embodiments, second portion 923 may have a constant node density. In various embodiments, second portion 923 may have a varying node density, similar to the node density of metal lattice 800 for example, with momentary reference to FIG. 8.

Figure 10:
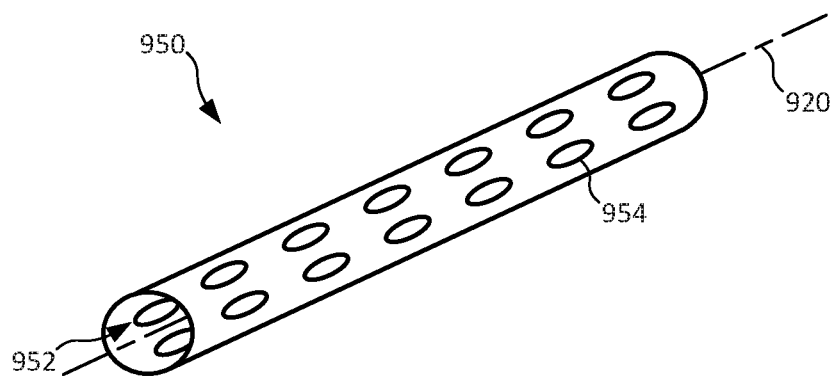
FIG. 10 illustrates an isometric view of a liner for a metal lattice, in accordance with various embodiments.

With reference to FIG. 10, a liner 950 for a metal lattice is illustrated, in accordance with various embodiments. In various embodiments, liner 950 may comprise a cylindrical geometry. Liner 950 may define a main channel 952. Liner 950 may define a centerline axis 920. Liner 950 may define a plurality of apertures 954. Liner 950 may be manufactured using additive manufacturing processes.

Figure 11A:
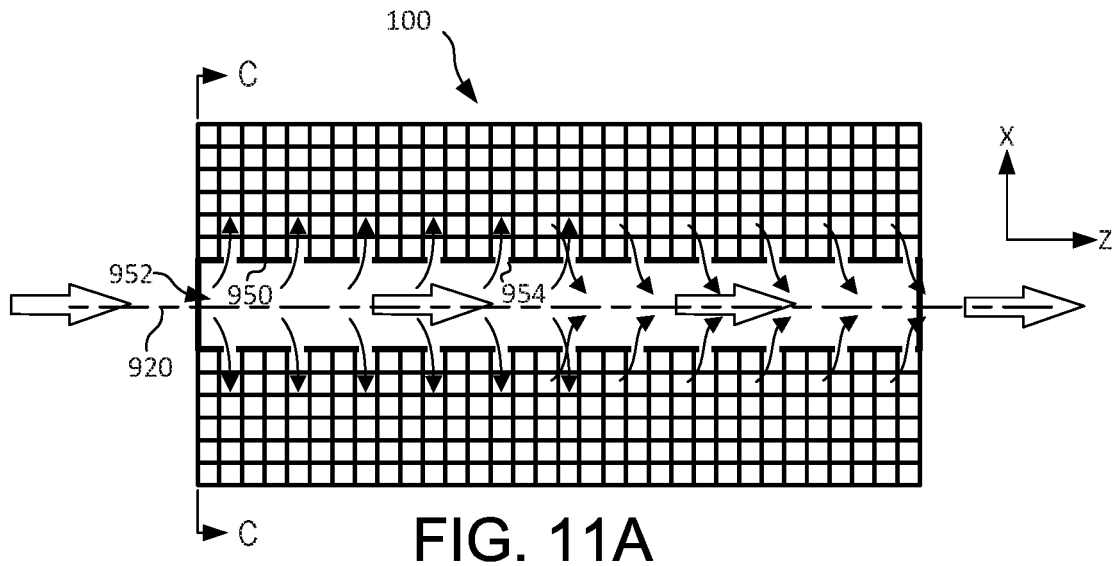
FIG. 11A illustrates a cross-sectional view of a metal lattice body extending from the liner of FIG. 10, in accordance with various embodiments.
Figure 11B:
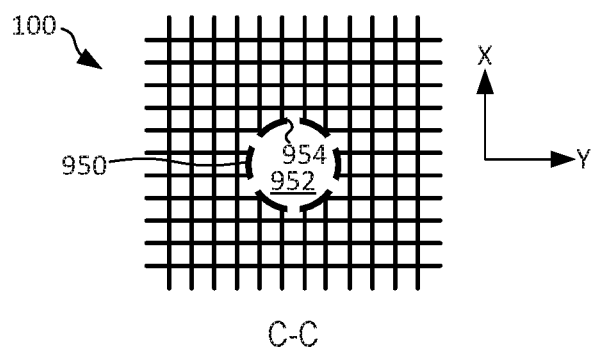
FIG. 11B illustrates a perpendicular cross-sectional view of the metal lattice body of FIG. 11A, in accordance with various embodiments.

With reference to FIG. 11A and FIG. 11B, a metal lattice 100 is illustrated, in accordance with various embodiments. Metal lattice 100 may comprise liner 950. Stated differently metal lattice 100 may extend from liner 950. Liner 950 may be manufactured with metal lattice 100 during a single additive manufacturing process. In this regard, metal lattice 100 and liner 950 may comprise a single piece of material. Apertures 954 may permit air to flow from channel 952 into metal lattice 100 whereby $CO_2$ may be transferred from the air into an amine solution supported throughout metal lattice 100.

Figure 11C:
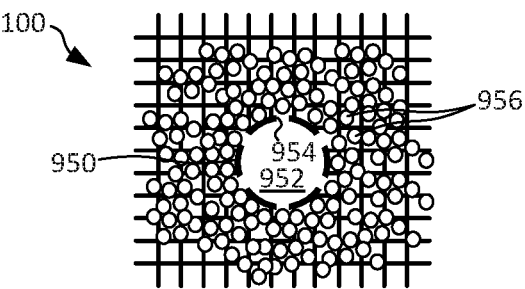
FIG. 11C illustrates a schematic view of a support material disposed throughout the metal lattice body of FIG. 11A, in accordance with various embodiments.

With reference to FIG. 11C, a schematic view of metal lattice 100 supporting a support material 956 (omitted in FIG. 9A and FIG. 9B for clarity purposes) is illustrated, in accordance with various embodiments. Support material 956 may comprise a plurality of beads or pellets. Support material 956 may comprise the amine solution for absorbing carbon dioxide from air flowing through metal lattice 100. Node density of metal lattice 100 may be sized to allow for support material 956 to move throughout metal lattice 100. For example, support material 956 may be poured into metal lattice 100 after metal lattice 100 is manufactured. Apertures 954 may be sized to prevent support material 956 from entering channel 952. In this regard, a width of apertures 954 may be less than a width of support material 956.

Figure 12A:
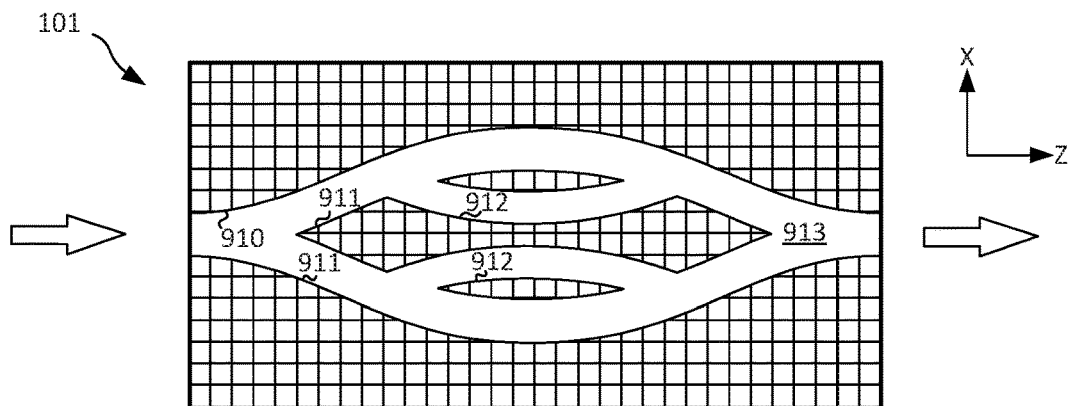
FIG. 12A illustrates a cross-sectional view of a metal lattice body defining hollow channels, in accordance with various embodiments.

With reference to FIG. 12A, a metal lattice 101 is illustrated, in accordance with various embodiments. Metal lattice 200 of FIG. 2 may be similar to metal lattice 101, in accordance with various embodiments. In various embodiments, metal lattice 101 may comprise a plurality of branched channels. For example, metal lattice 101 may comprise a main channel 910 which may divide into two or more secondary channels 911. Each secondary channel 911 may branch into a tertiary channel 912. The channels 910, 911, 912 may be defined by a liner, similar to liner 950 of FIG. 10A, or may be defined by a void in the metal lattice.

Figure 12B:
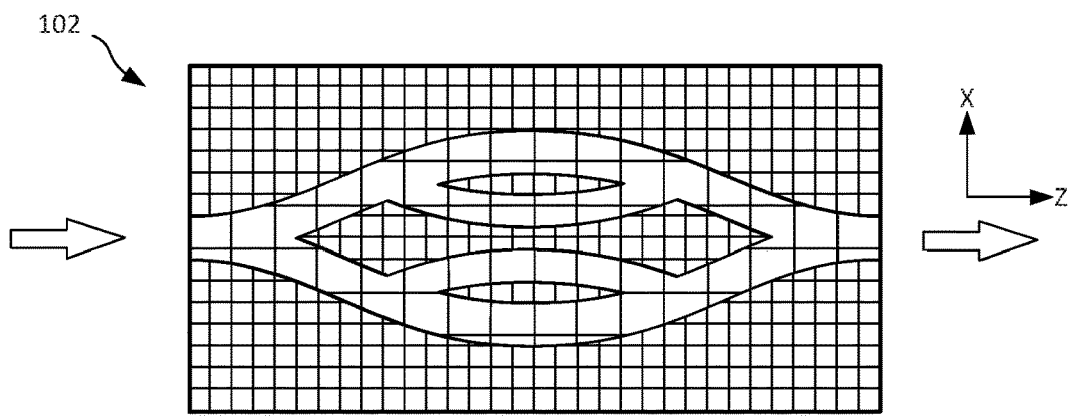
FIG. 12B illustrates a cross-sectional view of a metal lattice body defining channels having a portion of the metal lattice body extending therein, in accordance with various embodiments.

With reference to FIG. 12B, a metal lattice 102 is illustrated, in accordance with various embodiments. Metal lattice 102 may be similar to metal lattice 101 except that the channels disposed in metal lattice 102 comprise lattices extending there through wherein the density of the lattices disposed within the channels is less than the density of the metal lattice disposed outside of the channels. Stated differently, the channels may be defined by a metal lattice portion having a decreased density with respect to the remainder of the metal lattice. The channels may be defined by a liner, similar to liner 950 of FIG. 10A, or may be defined by a reduced density of the metal lattice.

Figure 13:
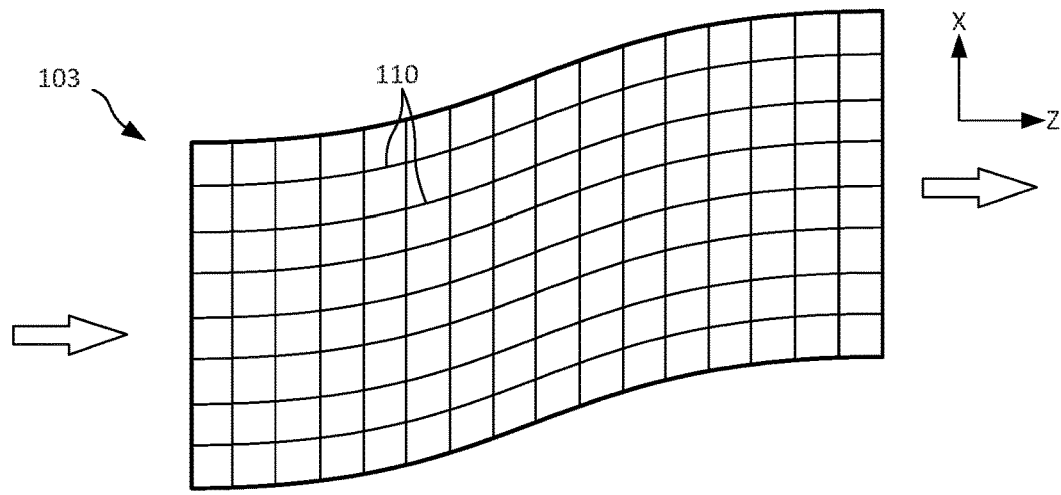
FIG. 13 illustrates a cross-sectional view of a metal lattice comprising a curved profile, in accordance with various embodiments.

With reference to FIG. 13, a metal lattice 103 is illustrated, in accordance with various embodiments. Metal lattice 200 of FIG. 2 may be similar to metal lattice 103, in accordance with various embodiments. Metal lattice 103 may comprise a non-linear profile (e.g., a curved profile). Metal lattice 103 may comprise non-linear ligaments 110. In this regard, ligaments 110 may be curved. In this regard, metal lattice 103 may be manufactured to conform to compact and/or oddly shaped cavities.

Figure 14:
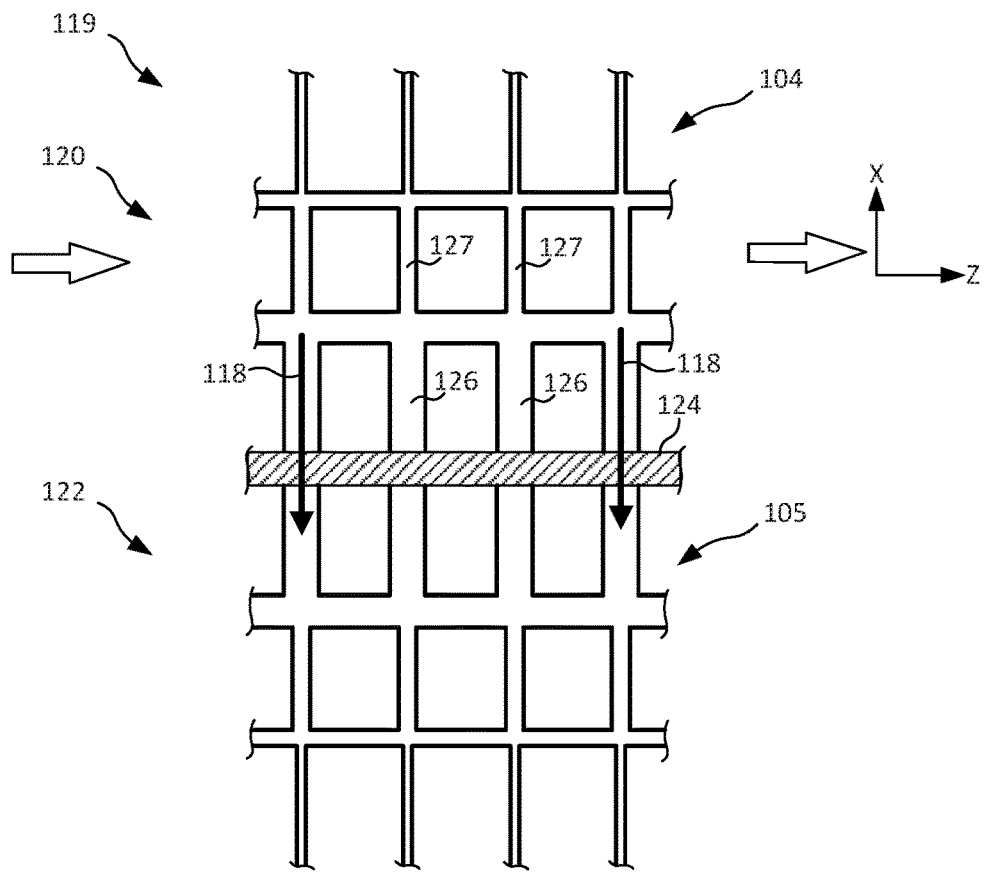
FIG. 14 illustrates a cross-sectional view of a first bed and a second bed separated by a common wall, wherein a metal lattice body of the first bed and the second bed has a varying ligament thickness for improved thermal transport, in accordance with various embodiments.

With reference to FIG. 14, a portion of a $CO_2$ scrubber—such as $CO_2$ scrubber 10 of FIG. 1 for example—is illustrated, in accordance with various embodiments. Said $CO_2$ scrubber may include a first bed 120 having a first metal lattice 104 and a second bed 122 having a second metal lattice 105. A common wall 124 may separate first metal lattice 104 from second metal lattice 105. Stated differently, first metal lattice 104 may extend from common wall 124 in a first direction and second metal lattice 105 may extend from common wall 124 in a second direction opposite from the first direction. In various embodiments, common wall 124 may be manufactured with first metal lattice 104 and second metal lattice 105 during a single additive manufacturing process, such as a layer-by-layer laser sintering process for example. In this regard, common wall 124, first metal lattice 104, and second metal lattice 105 may comprise a single piece of material. In various embodiments, common wall 124 may be manufactured separately from first metal lattice 104 and second metal lattice 105.

In various embodiments, first metal lattice 104 may comprise a first plurality of ligaments 126 directly contacting common wall 124. First plurality of ligaments 126 may comprise a first thickness. First metal lattice 104 may comprise a second plurality of ligaments 127 disposed opposite first plurality of ligaments 126 from common wall 124. Second plurality of ligaments 127 may comprise a second thickness. The first thickness may be greater than the second thickness. In this manner, the thickness of the ligaments may successively increase along metal lattice 104 in the direction of common wall 124 (i.e., along the negative X-direction). In this manner, metal lattice 104 may tend to provide a heat transfer path by which heat, as a result of the exothermic reaction of $CO_2$ with the amine solution, may be transferred from first metal lattice 104 to common wall 124, and further into second metal lattice 105, as illustrated by arrows 118.

In various embodiments, second metal lattice 105 may mirror first metal lattice 104 about common wall 124. In this manner, first metal lattice 104 may tend to aid in transferring heat from first metal lattice 104 to second metal lattice 105.

Figure 15:
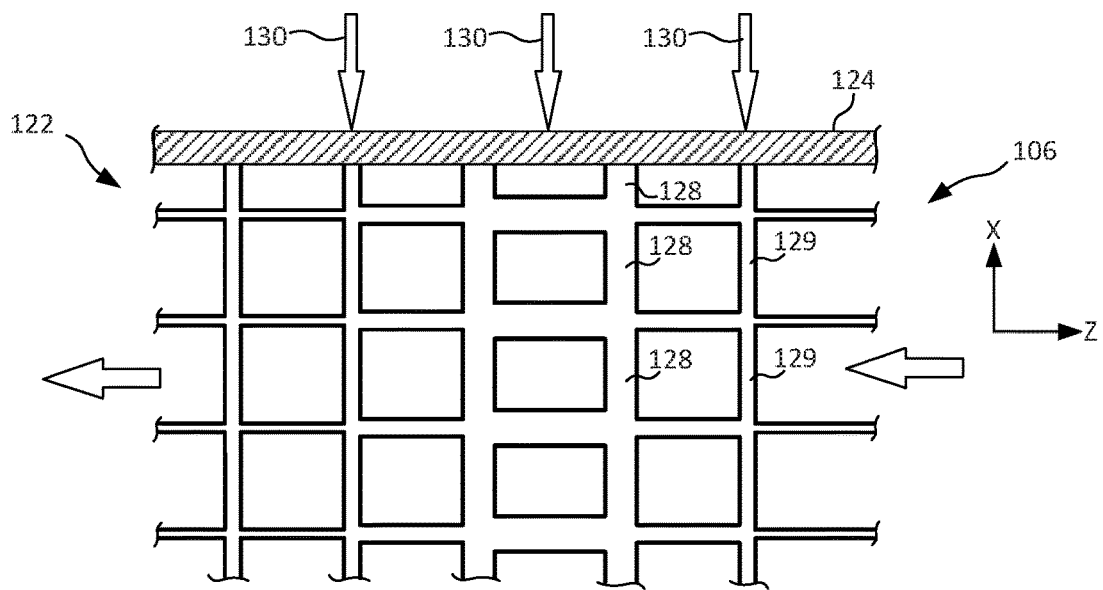
FIG. 15 illustrates a cross-sectional view of a second bed extending from a common wall, wherein a metal lattice body of the first bed and the second bed has a varying ligament thickness for improved structural integrity, in accordance with various embodiments.

With reference to FIG. 15, a portion of a $CO_2$ scrubber—such as $CO_2$ scrubber 10 of FIG. 1 for example—is illustrated, in accordance with various embodiments. Said $CO_2$ scrubber may include a first bed (omitted for clarity purposes) having a first metal lattice and a second bed 122 having a second metal lattice 106. Common wall 124 may separate first metal lattice from second metal lattice 105.

In various embodiments, second metal lattice 106 may comprise a first plurality of ligaments 128 extending from common wall 124. First plurality of ligaments 128 may comprise a first thickness. Second metal lattice 106 may comprise a second plurality of ligaments 129 disposed longitudinally (in the Z-direction), also referred to herein as a direction parallel with common wall 124, from first plurality of ligament 128. Second plurality of ligaments 129 may comprise a second thickness. The first thickness may be greater than the second thickness. A pressure 130 from the first bed may act on common wall 124 in response to a pressure of second bed 122 decreasing, for example as a result to being exposed to vacuum. In this regard, first plurality of ligaments 128 may form a one or more columns, supporting metal lattice 106 from buckling, or otherwise deforming in an excessive manner, in response to a pressure gradient across common wall 124.

Figure 16:
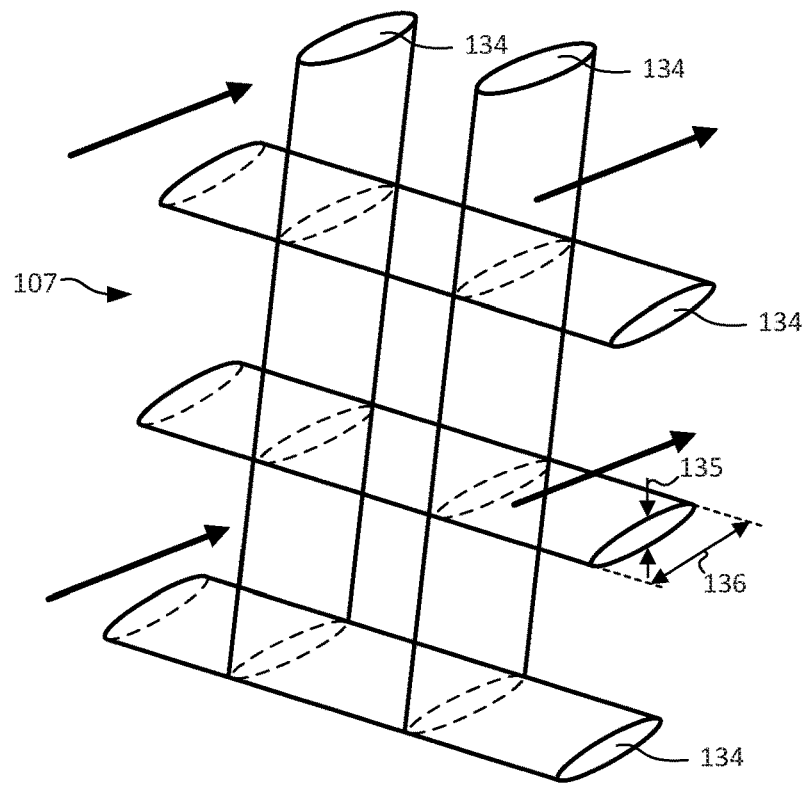
FIG. 16 illustrates an isometric view of a metal lattice having an aerodynamic profile for directing a flow of air through the metal lattice, in accordance with various embodiments.
Figure 17:
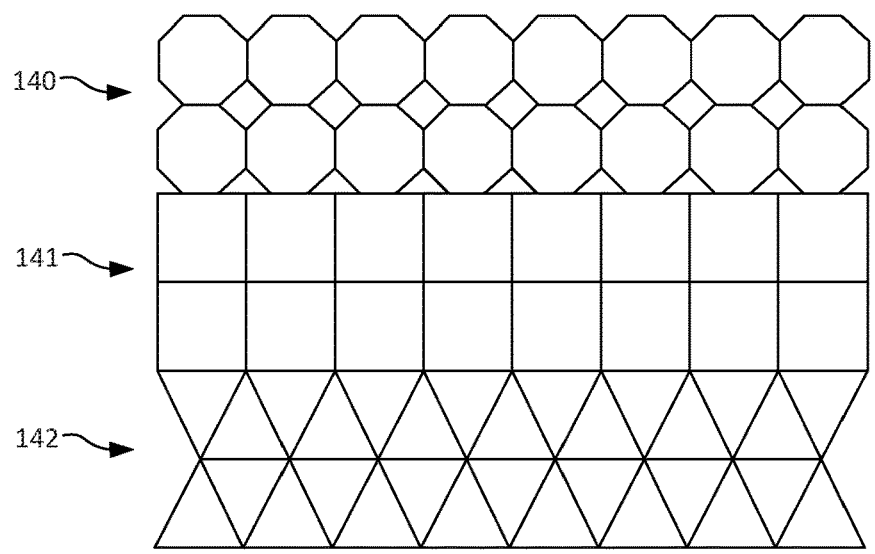
FIG. 17 illustrates various cross-sectional profiles of a metal lattice body, in accordance with various embodiments.

With reference to FIG. 16, a metal lattice 107 is illustrated, in accordance with various embodiments. Metal lattice 107 may comprise a plurality of ligaments 134. Each ligament 134 may comprise an aerodynamic profile. Each ligament 134 may comprise a high aspect ratio, wherein the term high aspect ratio, as used herein, refers to an aspect ratio of greater than 2, and in various embodiments, an aspect ratio of greater than 3, and in various embodiments, an aspect ratio of greater than 4. The aspect ratio is defined as the ratio of the length 136 and the width 135 of the ligament 134. In various embodiments, ligaments 134 may comprise an ellipsoidal profile. In various embodiments, ligaments 134 may comprise an airfoil. Ligaments 134 may tend to direct the direction of flow of air using aerodynamic forces.

Having described various metal lattices, with respect to FIGS. 2 through FIG. 16, having cross-sectional profiles that are square, it is contemplated herein that a metal lattice may have a sectional profiles having any suitable geometry. For example, with reference to FIG. 17, a metal lattice may have an octagonal sectional profile 140, a square sectional profile 141, a triangular sectional profile 142, or any other suitable polygonal or non-polygonal sectional profile, including circular sectional profiles, among others.

Furthermore, it should be noted that to FIGS. 2 through FIG. 17 illustrate various sectional geometries of metal lattices in the two-dimensional space for clarity purposes. However, metal lattices as provided herein, of course, are three dimensional lattices. FIGS. 18A through FIG. 18F provide exemplary isometric views of a metal lattice in the three-dimensional space. In this regard, structural features of a metal lattice, as described herein with respect to FIGS. 2 through FIG. 17, may be applied to the metal lattices of FIG. 18A through FIG. 18F.

Figure 18A:
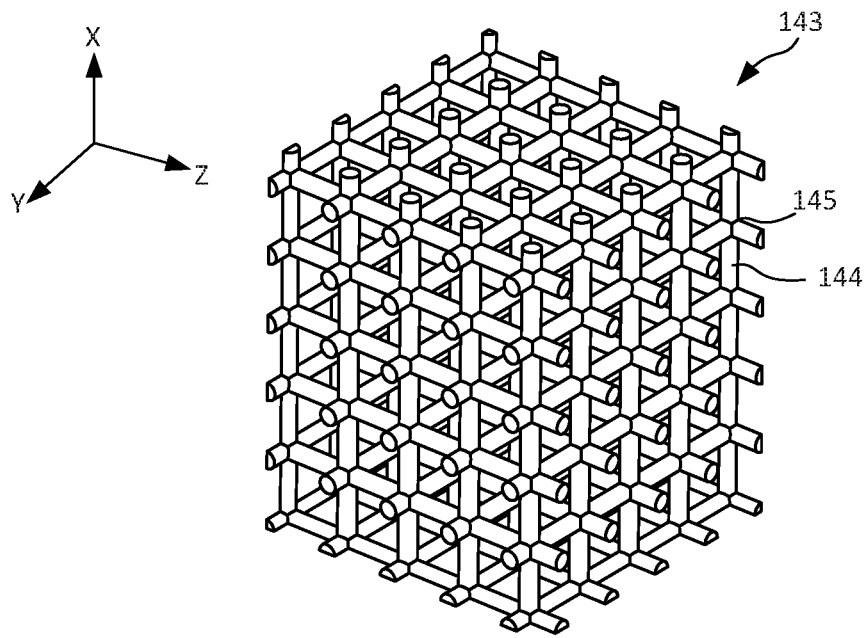
FIGS. 18A, 18B, 18C, 18D, 18E, and FIG. 18F illustrate various isometric views of a metal lattice, in accordance with various embodiments.

With reference to FIG. 18A, a metal lattice 143 is illustrated, in accordance with various embodiments. Metal lattice 143 is a cubic lattice defined by cylindrical ligaments 144 that intersect to form nodes 145. Stated differently, metal lattice 143 may define a plurality of unit cells, each unit cell defining a cubic geometry. Adjacent unit cells may have common nodes and/or ligaments. Each node 145 may have six ligaments extending therefrom.

Figure 18B:
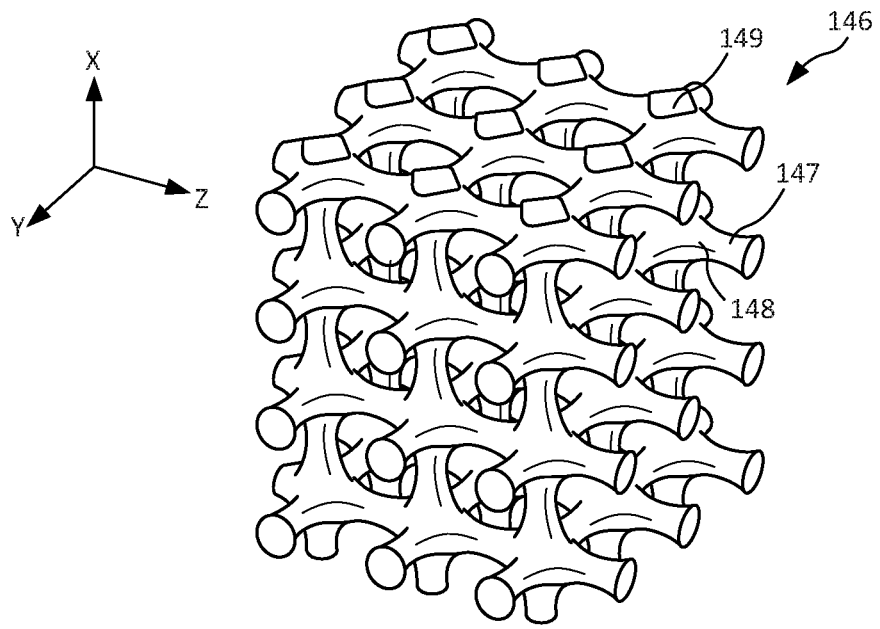

With reference to FIG. 18B, a metal lattice 146 is illustrated, in accordance with various embodiments. Metal lattice 146 is a cubic lattice defined by ligaments 147 that intersect to form nodes 149. A fillet 148 may be disposed at the interface of each ligament 147 and node 149. In this manner, metal lattice 146 may comprise smooth transitions between each ligament 147.

Figure 18C:
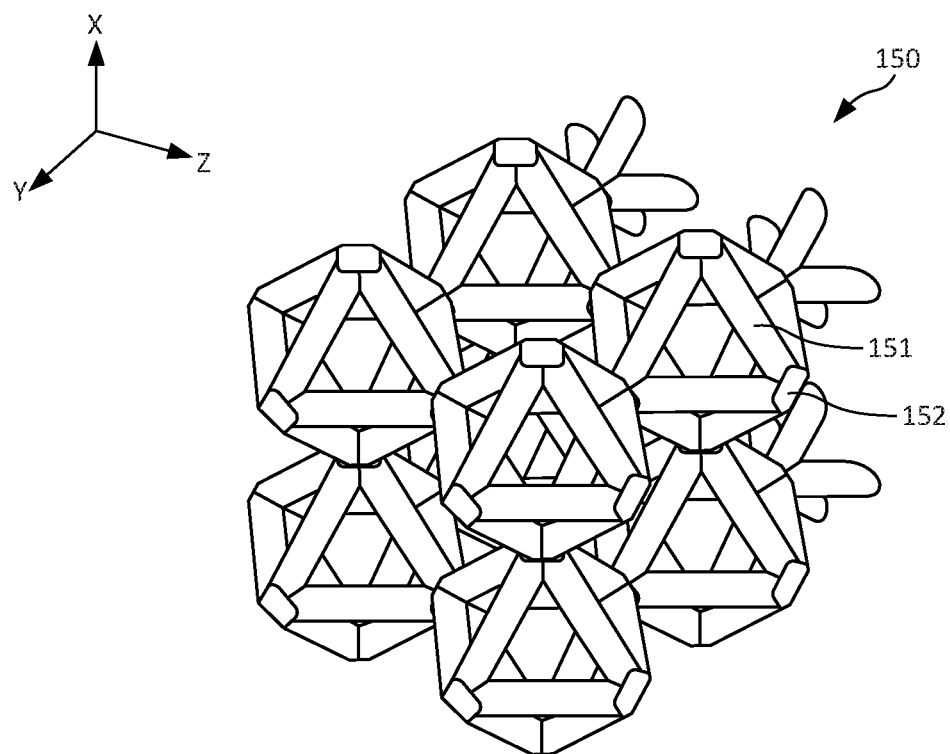

With reference to FIG. 18C, a metal lattice 150 is illustrated, in accordance with various embodiments. Metal lattice 150 may define a plurality of ligaments 151 intersecting to form node 152. The plurality of ligaments may be disposed in a octahedral geometry, thereby defining octahedral unit cells. Each node 152 may have eight ligaments extending therefrom.

Figure 18D:
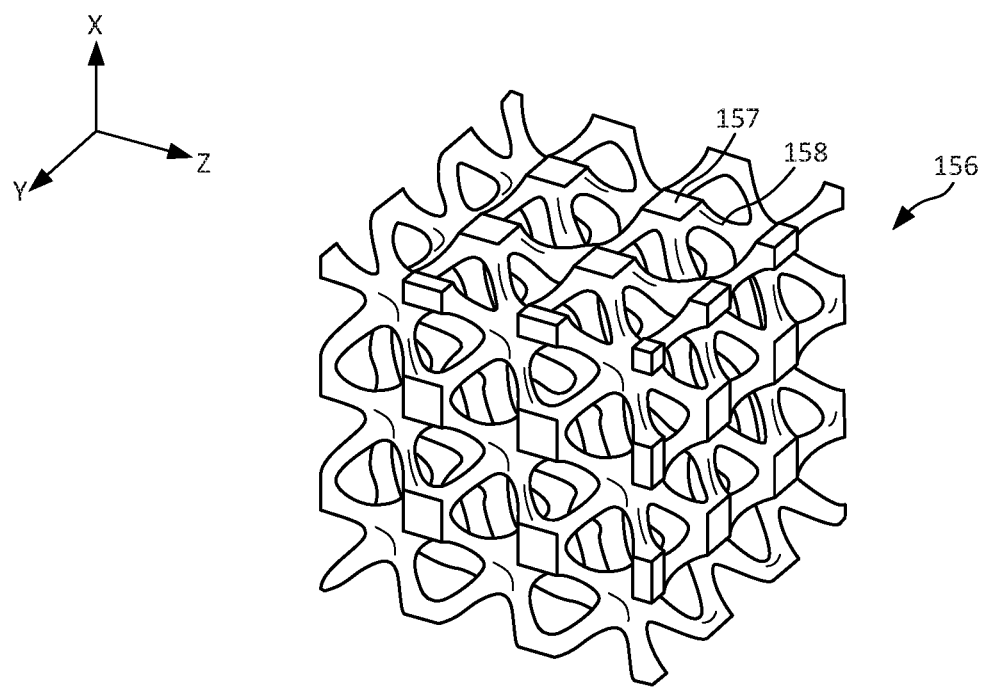

With reference to FIG. 18D, a metal lattice 156 is illustrated, in accordance with various embodiments. Metal lattice 156 may define a plurality of octahedral unit cells with each node 157 having eight ligaments extending therefrom. Each node may define smooth transitions between ligaments.

Figure 18E:
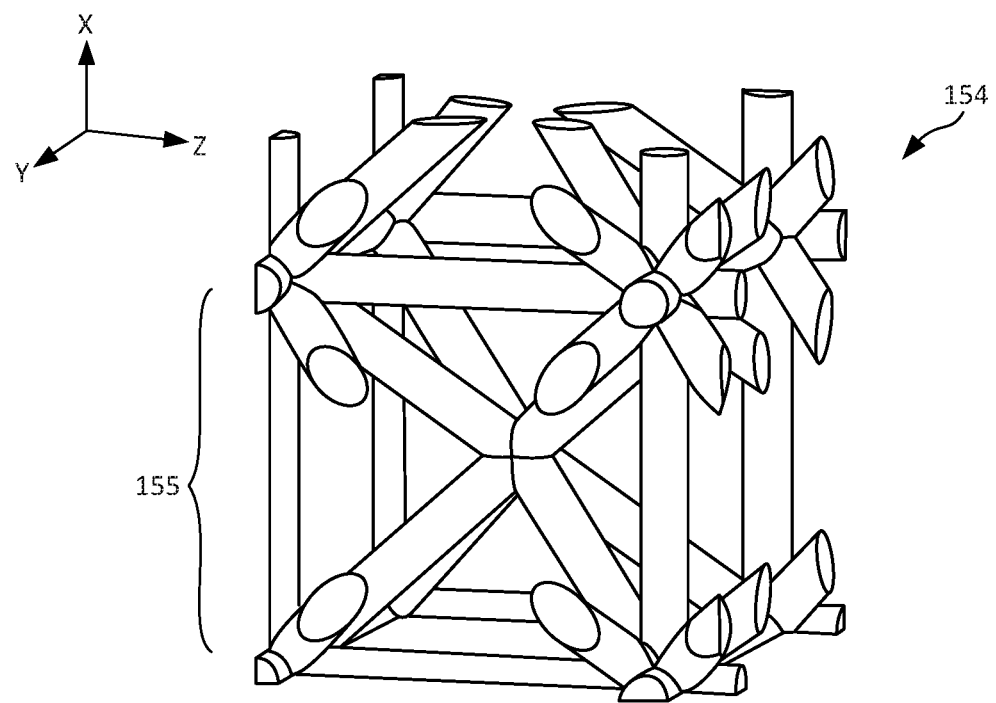

With reference to FIG. 18E, a metal lattice 154 is illustrated, in accordance with various embodiments. Metal lattice 154 may define a plurality of body-centered cubic unit cells 155.

Figure 18F:
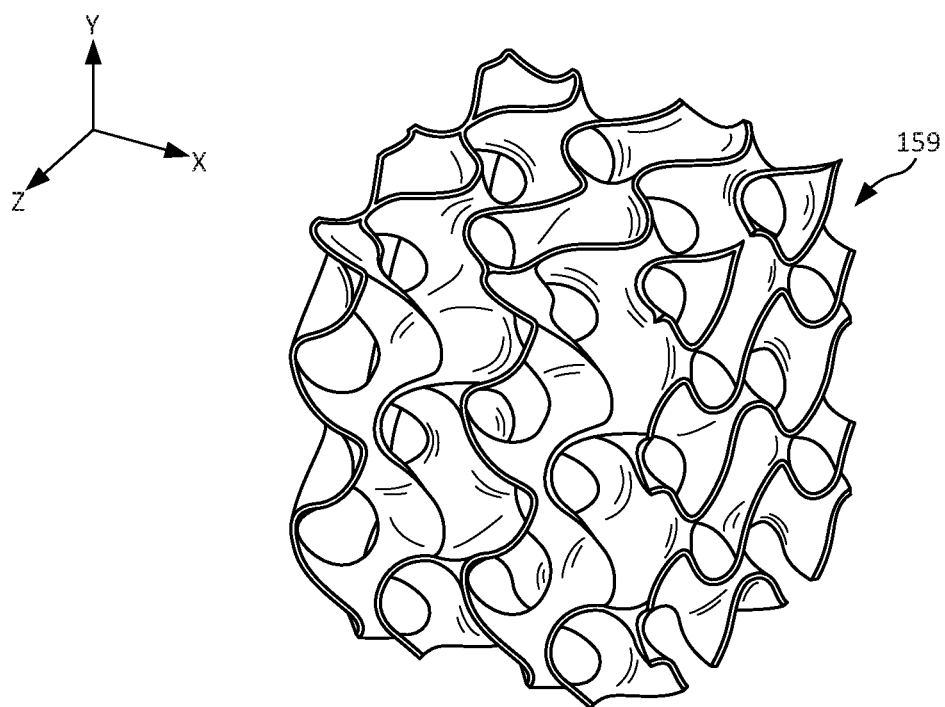

With reference to FIG. 18F, a metal lattice 159 is illustrated, in accordance with various embodiments. Metal lattice 159 may define a gyroid.

Figure 19:
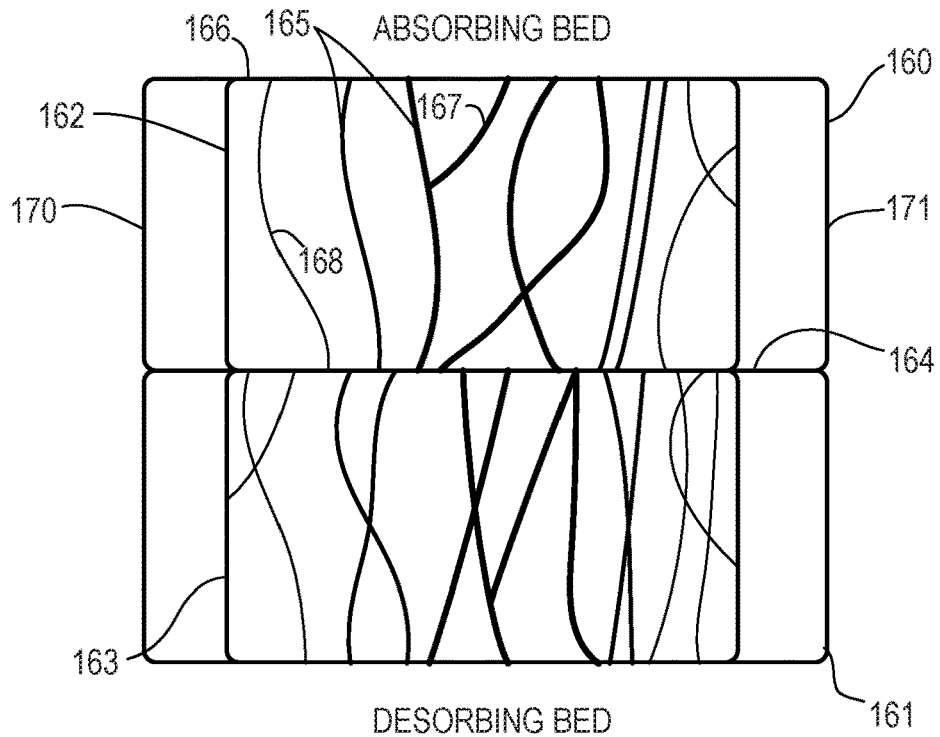
FIG. 19 illustrates a schematic view of a first bed and a second bed having an unstructured metal lattice having varying ligament thicknesses, in accordance with various embodiments.

With reference to FIG. 19, a first bed 160 and a second bed 161 of a $CO_2$ scrubber is illustrated, in accordance with various embodiments. First bed 160 may include metal lattice 162 and second bed 161 may include metal lattice 163. First bed 160 and second bed 161 may share a common wall 164 dividing metal lattice 162 from metal lattice 163. Metal lattice 162 may comprise an unstructured lattice. Metal lattice 162 may comprise a plurality of ligaments 165 extending between common wall 164 and housing 166 of first bed 160. Metal lattice 162 may comprise one or more ligaments 167 extending between housing 166 of first bed 160 and plurality of ligaments 165. In this regard, ligament 167 may terminate on one of the ligaments 165. Metal lattice 162 may be manufactured using additive manufacturing processes. Metal lattice 162 may be manufactured using tack welding processes. For example, the ligaments may comprise wires tack welded to housing 166 and/or each other. Metal lattice 162 may be manufactured using weaving processes. Metal lattice 162 may comprise ligaments having varying thicknesses. For example, ligaments (e.g., ligament 167) located between twenty-five percent and seventy-five percent of the distance between inlet 170 and outlet 171 may be thicker than ligaments (e.g., ligament 168) disposed within twenty-five percent of the distance between inlet 170 and outlet 171 of inlet 170 and/or outlet 171.

Figure 20:
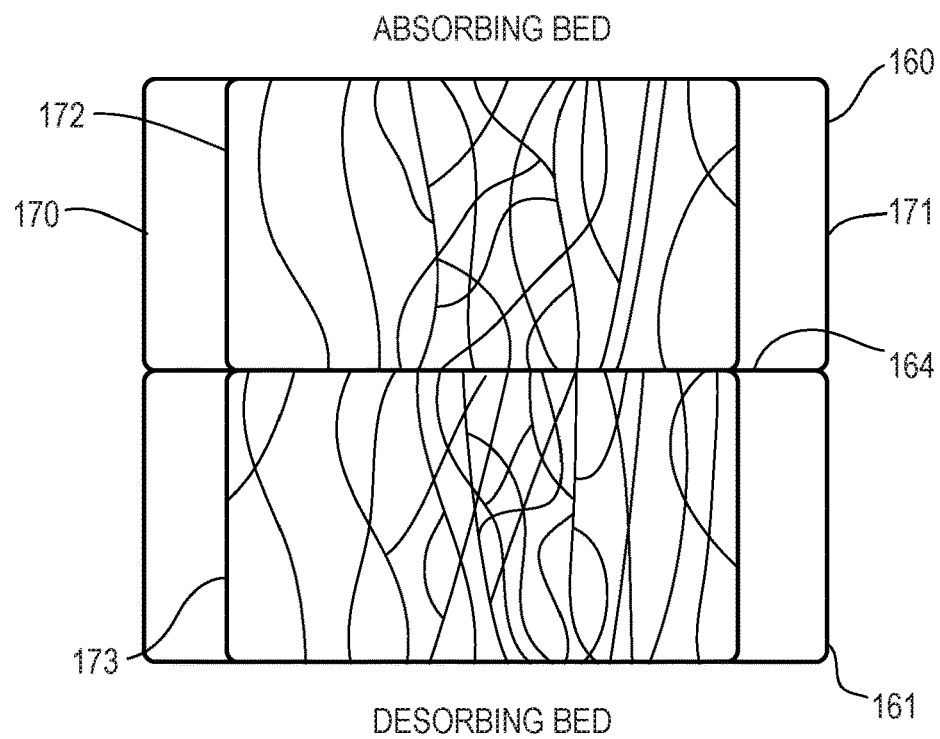
FIG. 20 illustrates a schematic view of a first bed and a second bed having an unstructured metal lattice having varying lattice density, in accordance with various embodiments.

With respect to FIG. 20, elements with like element numbering, as depicted in FIG. 19A, are intended to be the same and will not necessarily be repeated for the sake of clarity.

With reference to FIG. 20, first bed 160 and second bed 161 is illustrated, in accordance with various embodiments. Unlike metal lattice 162 and metal lattice 163 of FIG. 19 which has ligaments of varying thicknesses, metal lattice 172 and metal lattice 173 may each comprise a metal lattice having varying ligament density, wherein the ligaments comprise the same thickness. For example, ligaments located between twenty-five percent and seventy-five percent of the distance between inlet 170 and outlet 171 may be disposed closer to one another than ligaments disposed within twenty-five percent of the distance between inlet 170 and outlet 171 of inlet 170 and/or outlet 171. In this regard, the density of a metal lattice may be varied by increasing and/or decreasing ligament thickness, in accordance with various embodiments. Furthermore, the density of a metal lattice may be varied by increasing and/or decreasing ligament density (i.e., the spacing between adjacent ligaments), in accordance with various embodiments.

Figure 21:
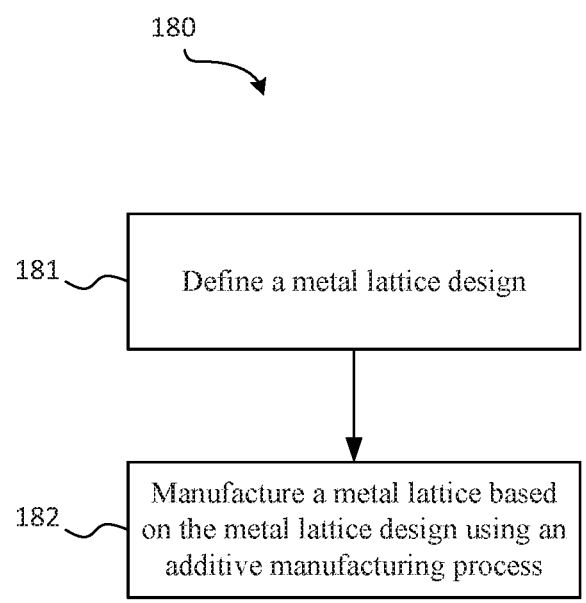
FIG. 21 illustrates a method for manufacturing a metal lattice for a carbon dioxide scrubber, in accordance with various embodiments.

In various embodiments and with reference to FIG. 21, a method 180 for manufacturing a metal lattice using additive manufacturing can include defining a metal lattice design (step 181). For example, step 181 can comprise utilizing two-dimensional or three-dimensional modeling techniques to create a metal lattice design having at least one of: improved strength, tuned bending and/or buckling resistance, improved natural frequency and/or vibration characteristics, improved thermal characteristics, and tuned aerodynamic characteristics. For example, the metal lattice design of step 181 can include geometric attributes such as varying node density and/or varying ligament thickness to improve thermal characteristics, aerodynamic characteristics, and/or structural characteristics.

In various embodiments, the metal lattice design of step 181 is then manufactured using an additive manufacturing technique (step 182). For example, step 182 can comprise using a technique such as direct laser sintering to manufacture a metal lattice, such as metal lattice 15, with momentary reference to FIG. 1, having the same geometry and configuration as the metal lattice design of step 181.

In various embodiments, a prototype metal lattice or a prototype metal lattice investment based on the metal lattice design of step 181 may be formed using an additive manufacturing process. For example, an additive manufacturing process can be used to form a polymeric or wax prototype metal lattice based on the metal lattice design of step 181. In other embodiments, an additive manufacturing process can be used to create a prototype metal lattice investment based on the metal lattice design of step 181. The prototype metal lattice can be made from any material suitable for use in a manufacturing process to form a lattice body.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metal lattice for a carbon dioxide scrubber, comprising:
   a metal lattice body defining a plurality of intersecting ligaments; and
   a liner extending through the metal lattice body and defining:
   a channel; and
   a plurality of apertures whereby the channel is in fluidic communication with the metal lattice body,
   wherein the channel is in fluidic communication with an exterior surface of the metal lattice body.

2. The metal lattice of claim 1, wherein the metal lattice is formed by an additive manufacturing process comprising one of a powder bed fusion process, a powder-feed directed energy deposition process, and a wire-feed directed energy deposition process.

3. The metal lattice of claim 2, wherein the metal lattice body and the liner are manufactured during a single additive manufacturing process.

4. The metal lattice of claim 1, wherein a portion of the metal lattice body extends into the channel.

5. The metal lattice of claim 1, wherein the liner comprises a cylindrical geometry.

6. The metal lattice of claim 1, wherein the plurality of apertures are sized to prevent a support material from entering the channel.

7. The metal lattice of claim 6, wherein a width of each aperture of the plurality of apertures is less than a width of the support material.

8. The metal lattice of claim 1, wherein the metal lattice and the liner comprise a single piece of material.

9. The metal lattice of claim 2, wherein the metal lattice is formed by the powder bed fusion process.

10. The metal lattice of claim 2, wherein the metal lattice is formed by the powder-feed directed energy deposition process.

11. The metal lattice of claim 2, wherein the metal lattice is formed by the wire-feed directed energy deposition process.

12. The metal lattice of claim 1, wherein nodes are formed at intersections of the plurality of intersecting ligaments.

13. The metal lattice of claim 12, wherein a node density of the metal lattice body varies.

14. The metal lattice of claim 13, wherein the metal lattice body comprises a cross-sectional profile having a first portion comprising a first node density and a second portion comprising a second node density at least partially surrounding the first portion, wherein the first node density is different from the second node density.

15. The metal lattice of claim 1, wherein a thickness of each the plurality of intersecting ligaments is constant.

16. The metal lattice of claim 1, wherein the metal lattice is made from a metal material comprising an aluminum or an aluminum alloy.

17. The metal lattice of claim 1, wherein a ligament thickness of the metal lattice body varies along at least one of a longitudinal direction or a transverse direction.

18. The metal lattice of claim 17, wherein the metal lattice body comprises a cross-sectional profile having a first portion comprising a first ligament thickness and a second portion comprising a second ligament thickness at least partially surrounding the first portion, wherein the first ligament thickness is different from the second ligament thickness.

19. The metal lattice of claim 18, wherein a node density of at least one of the first portion or the second portion is constant.

* * * * *